United States Patent Office 2,890,572
Patented June 16, 1959

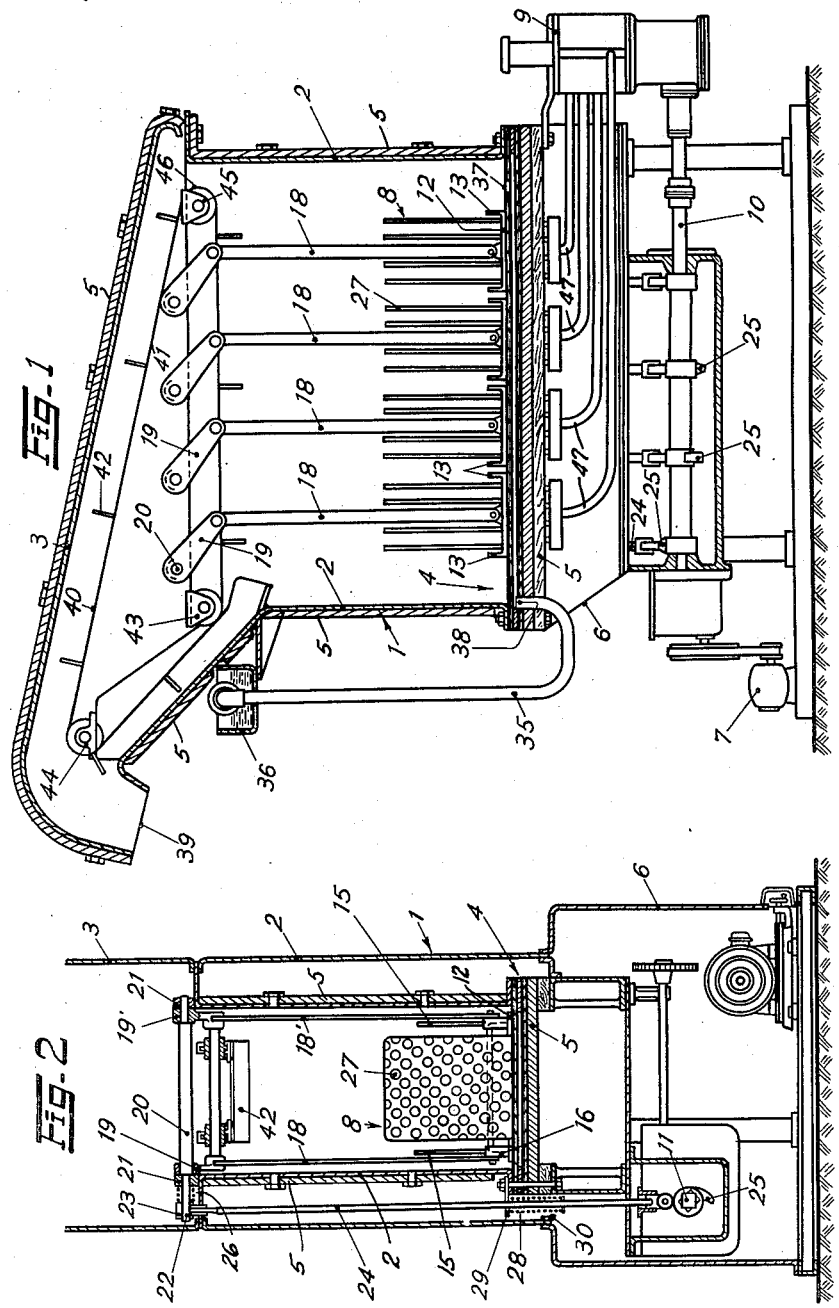

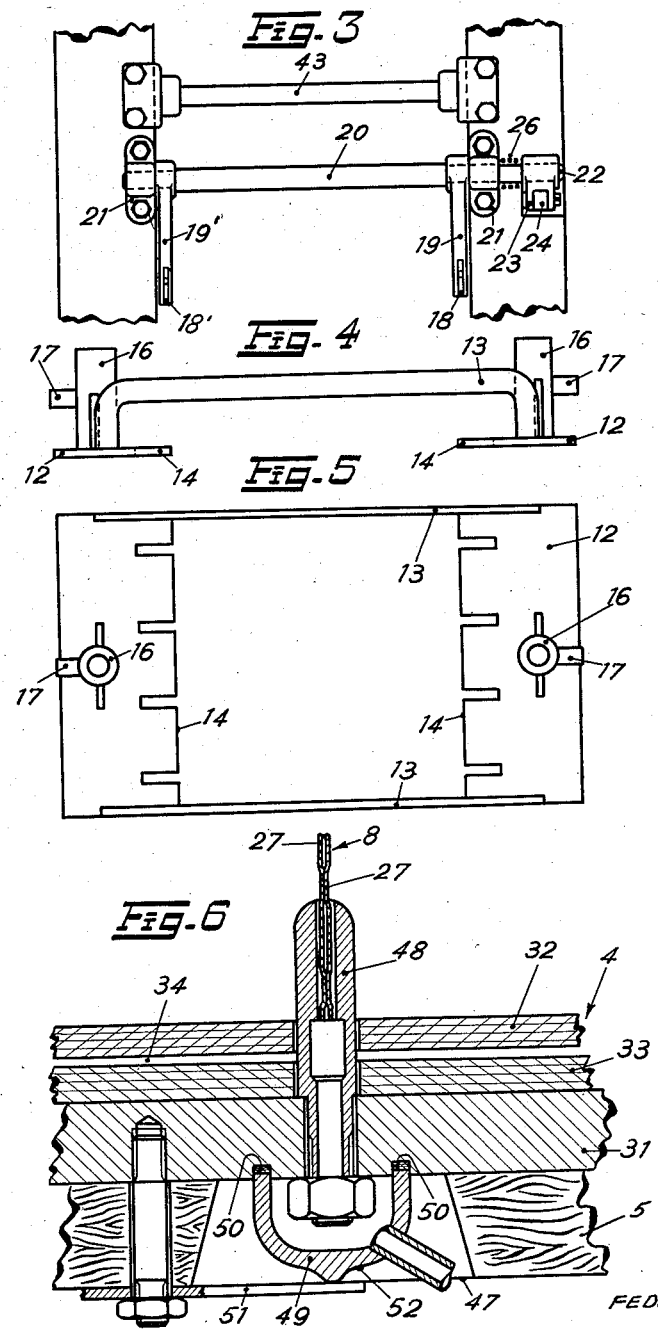

2,890,572
ICE MAKING MACHINE

Federico Richelli, Milan, Italy

Application December 9, 1955, Serial No. 552,091

Claims priority, application Italy October 20, 1955

7 Claims. (Cl. 62—233)

The present invention relates to a machine for producing ice plates or slabs as well as pieces of ice having different shapes and sizes.

As is known, a good deal of the artificially produced ice is at present used in the shape of more or less small pieces. In such a form ice is used to preserve fish, fruits and vegetables during transit and storage in the cheese-dairies and milk-gathering plants (milk central plants), in the chemical industries for refrigerating mixtures, cold accumulation, juice concentrations, and so on.

Starting from the consideration of these uses, some ice machine manufacturers have followed the direction to manufacture machines, producing small size ice pieces in which the ice is rapidly formed and delivered in the form of chips, small tubes, cubes, etc.

These machines have been constructed consisting essentially of one or more refrigerated drums, turning partly into a vessel containing the water to be frozen, the latter in contact with said cold drum, continuously freezing thereon, and being continuously taken away from it by one or more pressing tools, which comminute it, thus obtaining ice chips.

Other types of machines have been devised for producing ice chips, or ice in larger pieces wherein the ice is produced outside or inside of tubes. Generally speaking, these machines are rather complex and therefore expensive both from the stand-point of maintenance and operation.

I have devised and built a machine for producing ice in the form of small pieces, but not very small pieces, in industrial amounts, and also in smaller quantities such as those that are necessary in household use. My machine may, by altering its dimensions, be built to obtain ice plate or slab production on an industrial scale. This machine is inexpensive to manufacture and will produce ice rapidly at low cost.

The machine according to the present invention is essentially characterised in that it comprises a thermally insulated vessel, filled to a constant and adjustable level with water to be frozen with a plurality of groups of freezing plates known per se, disposed within the vessel. A freezing or refrigerating fluid is caused to circulate through the plates alternatively more and less cold according to a two step cycle with each plate group being successively frozen for the greater period of the cycle and defrosted during a short time. Auxiliary means are provided for detaching the ice from the plates. The means is prepared for operation during the freezing step and operated in the defrosting step, and thereafter brought again to its previous position through spring-urged means. Exchanging means of refrigerating unities are provided between the entering water to be frozen and the vessel bottom.

In other words, the machine for producing plate or slab ice according to the present invention is based upon the formation of an ice thickness value on known plates cooled to a low temperature, said plates being immersed in a vessel containing water. When the ice on the plates has reached the desired thickness, a device is included to change the refrigerating step to a heating one. This enables the ice to be detached from said plates through the action of the auxiliary means or a mechanical extracting device, synchronously driven with the temperature changing means.

Another suitable device conveys the ice to a sloped plane carrying the ice outside of the machine.

The vessel is kept filled with water to a constant level by means of a floating device placed in an auxiliary container.

The feeding water is introduced into the vessel after flowing through a jacket obtained between the vessel bottom and the refrigerating plate support so as to form a heat-exchanger which, on one side pre-cools the water entering into the vessel, on the other side prevents the cold from the plates to be transmitted to the same vessel bottom otherwise the accumulation of refrigerating unities would lead to the freezing of the bottom thereby locking the ice extracting device.

One embodiment of the machine for producing ice plates or slabs, according to the present invention, will be hereinafter more fully described, with reference to the accompanying drawings, wherein:

Figure 1 is a diagrammatic view of the machine according to this invention, seen in elevation, in a longitudinal section;

Figure 2 is a diagrammatic elevational cross-section of the same machine;

Figure 3 is a top view on an enlarged scale, showing in detail one of the controls for the auxiliary means cooperating in the raising and removal of the ice from the freezing plates, after the defrosting step;

Figures 4 and 5 are a view in elevation and top plane respectively, of one of said detachment-helping or auxiliary means, on an enlarged scale; and Figure 6 is, on a more enlarged scale, a vertical section of the vessel bottom, corresponding to the symmetry plan of one of said plates.

Referring to the accompanying drawings, the machine according to the present invention essentially consists of a vessel 1 comprising side walls 2, a suitably shaped cover or lid 3, a composite bottom generally indicated by 4. The entire vessel is thoroughly coated with a layer of thermal insulating material generally indicated by 5.

The vessel 1 rests on a frame-work 6 which also supports the electric motor 7 for actuating the machine, and some control members as will be hereinafter described.

Inside the vessel 1 are a plurality of groups of freezing plates 8 which are carried by the bottom 4, with each group being connected to a known distributor 9 for the refrigerating fluid by conduits 47 and cup connectors 49 and which is driven by the motor 7 through a shaft 10 and a speed reducer 11.

The distributor is actuated so as to develop, for each plate 8 group, a two step cycle having one step of a greater length during which a freezing fluid is sent to the plates, i.e. a very cold fluid, and another step of a very much shorter length of time during which the plates 8 are fed with a fluid (which may be and preferably is the same) having a slightly higher temperature, with the purpose of obtaining a superficial defrosting of the plates 8.

Each group of plates is fitted with an extracting device, which essentially consists of a double combed member 12, 12. The parts 12 are connected to each other by arched members 13, between the teeth 14 of which, plates 8 are placed, in each group. Said extractor is mounted to be vertically sliding with respect to its own plate group and its upwardly motion is guided by rods 15 fixed to the vessel bottom 4. Each of said extractors having integral therewith two vertical bushings 16 whereing rods 15 are journaled. Bushings 16 have outside pivots 17 on which links 18 are pivotally mounted. Said links 18 are in turn pivotally connected to other links 19 which are susceptible to rotate but not to translate on a shaft 20 journaled on supporting members 21. On the other side of each plate 8 there are similar links 18' and 19'.

At the outer end 22 of the shaft 20 links 23 are pivotally mounted, but without the ability to move axially. On links 23 are pivotally mounted rods 24 which are driven by their respective cams 25 fastened (together with other similar cams for the other plate groups) to the shaft 10. Such cams are suitably angularly shifted with respect to one another according to the number of plate groups provided for the vessel 1.

In this manner a synchronous operation of the distributor (and then of the refrigerating fluid steps) is obtained, coordinated with the extracting devices.

Said links 19 and 23 are at pairs connected by a respective torsional spring 26. At the beginning of their operation cycle, the extractors are resting as usually on the bottom of the vessel 1, and by the ice formation on the walls 27 of the plate 8, are held on the same bottom 4 of the vessel 1.

By the rotation of the respective cam 25 the rod 24 is raised and thereby the link 23 is caused to rotate, but cannot rotate since the respective extractor is held by the ice which has formed on the walls 27 of the plates 8, as long as the freezing step lasts.

In such a manner the spring 26 is charged and is kept under charge until the very short defrosting step begins for the plates 8 of the respective group. Afterwards, the extractor no longer being firmly held by the ice, snaps up and frees the ice from that group of plates. That is, during a freezing interval which is the greater portion of a cycle, when the colder fluid is flowing through the plates 27, the double-comb member 12—12 is resting in its lowest position while ice is forming on the plates 27. At a predetermined time and for a predetermined interval, fluid at a less cold temperature is made to circulate through plates 27 and thereby cause a partial defrosting of the ice formations thereon. Simultaneously, cam 25 urges rod 24 upward which rotates crank 23 counterclockwise with respect to Figure 1. Crank 23 is operatively connected to crank 19 by means of torsion spring 26 with rod 18 interconnecting crank 19 to pin 17 of double-comb member 12—12.

Initial rotation of crank 23 causes crank 19 to rotate in the same direction and raise its associated double-comb member 12—12 until the teeth 14 strike the ice formations on plates 27. Further movement of crank 19 ceases but crank 23 continues to rotates and load torsion spring 26. During the time that crank 23 is being rotated a partial defrosting of the ice formation is taking place adjacent to plates 27. Some time during this interval the energy stored in the torsion spring will be sufficient to overcome the forces holding the ice formations to the plates 27 and at this time the double-comb member 12—12 will snap upward under the influence of torsion spring 26 with teeth 14 clearing the ice accumulations from the surfaces of plates 27.

The liberated pieces of ice will then float to the water's surface and be removed from the vessel 1 in a manner to be hereinafter described.

In the operation of the ice making machine as just described, the loading of torsion spring 26 began simultaneously with the beginning of the defrosting interval, but it is often preferable to commence the loading of spring 26 during the freezing cycle and have the loading continue into the defrosting or thawing cycle. Such operations take place in succession for each group of plates.

The raising of each of the rods 24 occurs against the action of a spring 28 which encircles the respective rod 24, between the abutting points 29 and 30 carried by the same rod 24 and the framework 6, respectively, so as the rod 24 will suddenly assume its home position.

In order to obtain proper operation of my device, it is of the utmost importance that the individual extractors are not frozen to the bottom 4 of vessel 1 and thereby permanently lock the moving parts of the machine or upset the synchronization of the various operations. Proper operating conditions are assured by providing the bottom 4 consisting of a metal plate 31, with one or more layers of a packing material, such as two layers or sheets of a rubbery material 32 and 33 (see in detail Figure 6). Layers 32, 33 are spaced thereby forming a substantially horizontal jacket 34 wherein the water to be frozen is caused to arrive through the piping 35 provided with a level-adjusting device 36. The upper sheet is pierced at a position 37 far from the inlet 38; similarly some water also flows through the passageways for the rods 15. With such an arrangement, a pre-cooling of the water for feeding the vessel 1 is obtained with the very important result of preventing the cold accumulation at the bottom 4 since in such region the temperature is always kept slightly higher than the temperature in the vessel 1 and no ice forms on the bottom 4. In this way the extractors are always free to move in the predetermined sequence.

As soon as the ice is made free of the plates 8, it moves upwardly because of its lower specific gravity in respect to that of the water and it is pushed towards the outlet mouth 39 (carried by the lid 3) through the action of a shoving device 40 consisting of chains 41 equally spaced apart vanes 42 (see in detail Figures 1 and 2). Said chains 41 are mounted on shafts 43, 44 and 45 by means of sprocket pinions 46 and the like, also driven by the motor 7.

As may be seen in Figure 6, each plate 8 receives (or discharges) the refrigerating fluid through conduits 47 at the ends 48 to which plates 8 are welded.

Conduits 47 are carried by respective cup-shaped fittings 49 provided with packings 50, each fitting being held in place by a suitable removable stop member 51 pushing on the projection 52.

Although I have here described preferred embodiment of my novel invention, many variations and modifications will now be apparent to those skilled in the art, and I therefore prefer to be limited, not by the specific disclosure herein, but only by the appending claims.

I claim:

1. A machine for producing ice comprising a thermally insulated tank adapted to contain a predetermined level of water to be transformed into ice, a plurality of groups of freezing plates, an ejector means associated with each of said groups of freezing plates; said freezing plates being completely disposed within said tank below said level; distributing means including separate operative connections to each of said groups of freezing plates; said operative connections being adapted to conduct a circulating fluid from said distributing means to said groups of freezing plates at water freezing temperatures during a first predetermined time interval and at ice defrosting temperatures during a second predetermined time interval thereby permitting formation of ice on each of said groups of freezing plates during their respective first time intervals; said first and second time intervals for each group of freezing plates occurring in a predetermined sequence at a predetermined instant of time to thereby achieve a synchronized mode of operation between all of said groups of freezing plates; said ejector means being disposed within said tank and operatively positioned to engage said ice on their respective groups of freezing plates; individual spring means for each of said ejector means; said spring means being adapted to store energy and release the stored energy during the second time interval of the associated group of freezing plates to thereby enable said associated ejector means to clear said ice accumulations from the associated group of freezing plates with a snap action.

2. The machine as set forth in claim 1 also including a water jacket positioned within the tank adjacent to the bottom thereof and a water circulating means operatively connected to said water jacket; said water circulating means circulating the water to be frozen through said water jacket before said water to be frozen enters said tank.

3. A machine for producing ice plates or slabs and pieces of different shape and size comprising a thermally insulated vessel adapted to contain water to be transformed into ice, a distributing means and completely disposed within said tank a plurality of freezing plates and vertically reciprocated ejector means positioned exteriorly of said freezing plates said freezing plates being connected with the distributing means for the passage therethrough of a refrigerating fluid at water freezing temperature during a first predetermined interval and at ice defrosting temperature during a second predetermined interval thereby producing ice formations on said plates during said first interval, refrigeration exchangers between the water to be frozen on its entering into the vessel and the bottom of the same vessel whereby said water is pre-cooled before entering said vessel; said ejector means being positioned at the bottom of said vessel during said first time interval and being moved to a raised position during said second time interval.

4. A machine as claimed in claim 3 wherein the ejector means are operatively positioned to engage said ice formations; spring means being provided for storing energy; said ejector means being operatively connected to said spring means and actuable thereby; said spring means releasing energy during said second interval thereby enabling said ejector to periodically clear said ice accumulations from said freezing plates with a snap action.

5. A machine as claimed in claim 3 wherein the plurality of freezing plates are arranged in groups; said distributing means including separate operative connections to each of said groups of freezing plates; said operative connections being adapted to conduct said refrigerating fluid from said distributing means to said groups of freezing plates at water freezing temperatures during said first predetermined time interval and at ice defrosting temperatures during said second predetermined time interval thereby producing ice formations on each of said groups of freezing plates during their respective first time intervals; said first and second time intervals for each group of freezing plates occurring in a predetermined sequence at a predetermined instant of time to thereby achieve a synchronized mode of operation between all of said groups of freezing plates; said ejector means being disposed within said tank and operatively positioned to engage said ice on their respective groups of freezing plates; individual spring means for each of said ejector means; said spring means being adapted to store energy and release the stored energy during the second time interval of the associated group of freezing plates to thereby enable said associated ejector means to clear said ice accumulations from the associated group of freezing plates with a snap action.

6. A machine as claimed in claim 3 wherein said ejector means include comb-shaped members having teeth thereon; said freezing plates being disposed between said comb-shaped members; said teeth being positioned to engage said ice formations.

7. A machine as claimed in claim 6 wherein said ejector means are operatively connected to spring means and actuable thereby; said spring means releasing energy during said second interval enabling the said ejectors to periodically clear said ice accumulations from said freezing plates with a snap action.

References Cited in the file of this patent
UNITED STATES PATENTS

| | | |
|---|---|---|
| 2,221,212 | Wussow | Nov. 12, 1940 |
| 2,376,819 | Rundell | May 22, 1945 |
| 2,639,594 | Watt | May 26, 1953 |
| 2,683,356 | Green | July 13, 1954 |
| 2,693,680 | Lee | Nov. 9, 1954 |
| 2,695,502 | Muffly | Nov. 30, 1954 |

FOREIGN PATENTS

| | | |
|---|---|---|
| 925,476 | France | Mar. 31, 1947 |